(12) United States Patent
Li et al.

(10) Patent No.: US 11,150,458 B2
(45) Date of Patent: Oct. 19, 2021

(54) MULTI-MODE IMAGING OPTICAL SYSTEM

(71) Applicant: Institute of Medical Support Technology, Academy of System Engineering, Academy of Military Science, Tianjin (CN)

(72) Inventors: Chao Li, Tianjin (CN); Meng Lv, Tianjin (CN); Feng Chen, Tianjin (CN); Yaohua Du, Tianjin (CN); Zhi Cheng, Tianjin (CN); Yanfei Yang, Tianjin (CN); Meng Chen, Tianjin (CN)

(73) Assignee: INSTITUTE OF MEDICAL SUPPORT TECHNOLOGY, ACADEMY OF SYSTEM ENGINEERING, ACADEMY OF MILITARY SCIENCE, Tianjin (CN)

( * ) Notice: Subject to any disclaimer, the term of this patent is extended or adjusted under 35 U.S.C. 154(b) by 0 days.

(21) Appl. No.: 16/784,677

(22) Filed: Feb. 7, 2020

(65) Prior Publication Data

US 2020/0278526 A1 Sep. 3, 2020

(30) Foreign Application Priority Data

Feb. 12, 2019 (CN) .......................... 201910110665.0

(51) Int. Cl.
*G02B 21/16* (2006.01)
*G01N 21/64* (2006.01)
(Continued)

(52) U.S. Cl.
CPC ......... *G02B 21/16* (2013.01); *G01N 15/1434* (2013.01); *G01N 21/6458* (2013.01);
(Continued)

(58) Field of Classification Search
CPC ........ G02B 21/16; G02B 27/30; G02B 21/36; G01N 21/6458; G01N 15/1434;
(Continued)

(56) References Cited

U.S. PATENT DOCUMENTS

2014/0339446 A1\* 11/2014 Yamamoto ......... G01N 15/1434
250/576
2017/0350803 A1\* 12/2017 Jalali .................... G01N 33/537

\* cited by examiner

*Primary Examiner* — David P Porta
*Assistant Examiner* — Meenakshi S Sahu
(74) *Attorney, Agent, or Firm* — Tutunjian & Bitetto. P.C.

(57) ABSTRACT

The present invention discloses a multi-mode imaging optical system. The multi-mode imaging optical system includes a stage configured to hold a to-be-tested sample. An imaging unit implements in-situ imaging of the to-be-tested sample. An absorption and forward scattering illumination unit irradiates the to-be-tested sample, and forms absorption imaging or forward scattered light imaging in the imaging unit. A side scattering illumination unit performs a first oblique illumination on the to-be-tested sample, so that scattered light of microparticles in the to-be-tested sample forms side scattered light imaging in the imaging unit. A fluorescent illumination unit performs a second oblique illumination on the to-be-tested sample, and excites the microparticles in the to-be-tested sample to emit fluorescence, where the fluorescence forms fluorescence imaging in the imaging unit.

9 Claims, 3 Drawing Sheets

(51) Int. Cl.
*G01N 15/14* (2006.01)
*G02B 27/30* (2006.01)
*G02B 21/36* (2006.01)

(52) U.S. Cl.
CPC ............ *G02B 21/36* (2013.01); *G02B 27/30* (2013.01); *G01N 2021/6471* (2013.01); *G01N 2021/6478* (2013.01)

(58) Field of Classification Search
CPC ... G01N 2021/6478; G01N 2021/6471; G01N 15/1468; G01N 2015/1006; G01N 2021/1738; G01N 2021/4707; G01N 21/47
See application file for complete search history.

MULTI-MODE IMAGING OPTICAL SYSTEM

TECHNICAL FIELD

The present invention relates to the technical field of microparticle micro-imaging, and in particular, to a multi-mode imaging optical system.

BACKGROUND

At present, mainly two technical solutions, flow cytometry and fluorescence microscopy, are used to detect and analyze microparticles such as single cells, bacteria, and synthetic nanospheres. Flow cytometry usually uses a laser as a light source. A focused and shaped beam vertically irradiates a stage, and the cells stained with fluorescence generate scattered light and excited fluorescence under the irradiation of the laser beam. The two signals are received by both a forward photodetector and a 90° photodetector. The scattered light signal is detected at a small forward direction, and this signal basically reflects the cell volume. The fluorescent signal is received in a direction perpendicular to the laser beam, and is separated by a series of dichroic mirrors and bandpass filters to form a plurality of fluorescent signals of different wavelengths.

To-be-tested cells are stained and made into single-cell suspension. The stage is pressed into a flow chamber with certain pressure. The phosphate buffer containing no cells is ejected from a sheath fluid tube under the high pressure. There is a certain angle between the inlet direction of the sheath fluid tube and the stage. In this way, the sheath fluid can flow around the stage at a high speed to form a circular stream. The to-be-tested cells are arranged in a single line in the sheath fluid and pass through a detection area in turn. Flow cytometry is mature, but the equipment is costly and has a complex structure, and the internal fluid pipelines need to be maintained frequently.

With the development of the microfluidic technology, there is a growing trend for detecting and analyzing cells and bacteria in microfluidic chips. At present, only fluorescence microscopes can be used for microparticle detection in microfluidic chips. Generally, cells are first stained and made into a slide stage, and then placed on a fluorescence microscope stage for observation. Depending on the staining method (absorption staining or fluorescent staining), fluorescence imaging or light absorption imaging can be selected. A symmetric imaging function is also available. However, to implement various imaging modes of fluorescence microscopes, it is necessary to manually switch the light source and auxiliary optical components, and scattered light imaging is not supported. At present, some simple detection equipment for absorption imaging or fluorescence imaging has been available, but the functions are quite simple.

SUMMARY

The present invention is intended to provide a multi-mode imaging optical system, which can realize in-situ imaging of different modes for a to-be-tested sample, and features simple structure and low cost.

To achieve the above purpose, the present invention provides the following technical solution.

The present invention provides a multi-mode imaging optical system, where the multi-mode imaging optical system includes:

a stage, configured to hold a to-be-tested sample;

an imaging unit, configured to implement in-situ imaging of the to-be-tested sample;

an absorption and forward scattering illumination unit, disposed coaxially with the stage and the imaging unit in turn and configured to irradiate the to-be-tested sample, and form absorption imaging or forward scattered light imaging in the imaging unit;

a side scattering illumination unit, forming a first given angle with the stage and configured to perform first oblique illumination on the to-be-tested sample, so that scattered light of microparticles in the to-be-tested sample forms side scattered light imaging in the imaging unit; and a fluorescent illumination unit, forming a second given angle with the stage and configured to perform second oblique illumination on the to-be-tested sample, and excite the microparticles in the to-be-tested sample to emit fluorescence, where the fluorescence forms fluorescence imaging in the imaging unit.

Optionally, the absorption and forward scattering illumination unit includes:

an absorption and forward scattering collimation lens, coaxially arranged with the stage and configured to focus a beam;

an absorption and forward scattering light source, located on a focal plane of the absorption and forward scattering collimation lens away from the stage, and configured to emit absorbed light or forward scattered light, where the absorbed light or forward scattered light vertically irradiates the to-be-tested sample, and forms absorption imaging or forward scattered light imaging in the imaging unit; and a microplate, disposed corresponding to the absorption and forward scattering light source, where an aperture is provided in the microplate corresponding to the absorption and forward scattering light source, so that the absorbed light or forward scattered light can pass through the microplate.

Optionally, the absorption and forward scattering light source includes:

a forward scattering light source, configured to emit forward scattered light, where the forward scattered light irradiates the to-be-tested sample through the aperture opened in the microplate and the absorption and forward scattering collimation lens, so that scattered light of the microparticles in the to-be-tested sample forms forward scattered light imaging in the imaging unit; and a plurality of absorption light sources, symmetrically distributed around the forward scattering light source and configured to emit absorbed light, where the absorbed light irradiates the to-be-tested sample through the aperture opened in the microplate and the absorption and forward scattering collimation lens, so that transmitted light of the to-be-tested sample forms absorption imaging in the imaging unit.

Optionally, there are four absorption light sources.

Optionally, the side scattering illumination unit includes: a side scattering light source and a side scattering collimation lens, where the side scattering light source is located on a focal plane of the side scattering collimation lens away from the stage, and is arranged coaxially with a center of the side scattering collimation lens.

Optionally, the fluorescent illumination unit includes a fluorescent light source, a fluorescent collimation lens, and a first filter; the fluorescent light source is placed on a focal plane of the fluorescent collimation lens away from the stage; the first filter is placed between the fluorescent collimation lens and the stage; and the fluorescent light source, the fluorescent collimation lens, and the first filter are coaxially arranged along their centers.

Optionally, a transmission wavelength of the first filter is consistent with a center wavelength of the fluorescent light source.

Optionally, the imaging unit includes an objective lens, a light shielding plate, a second filter, an electronic ocular, and an area-array camera; the stage and the light shielding plate each are placed on a focal plane of the objective lens; and the area-array camera is configured to implement focus imaging of the to-be-tested sample.

Optionally, a black anti-dazzling screen is provided at a center of the light shielding plate to block directly transmitted illumination light.

Optionally, the second filter is a fluorescent filter.

According to specific embodiments of the present invention, the present invention discloses the following technical effects: In the multi-mode imaging optical system provided by the present invention, different illumination units are selected to irradiate a to-be-tested sample on a stage, and an imaging unit implements in-situ imaging of different modes for the to-be-tested sample on the stage. In this way, without the need to switch any components, in-situ absorption imaging, forward scattered light imaging, side scattered light imaging, and fluorescence imaging can be implemented for characteristic analysis and classification counting of microparticles on the stage. The present invention can be widely applied to scientific research, clinical examination, and industrial test.

BRIEF DESCRIPTION OF DRAWINGS

To describe the technical solutions in the embodiments of the present invention or in the prior art more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

In the figure, 1. absorption and forward scattering light source, 2. microplate, 3. absorption and forward scattering collimation lens, 4. fluorescent light source, 5. fluorescent collimation lens, 6. first filter, 7. side scattering light source, 8. side scattering collimation lens, 9. stage, 10. objective lens, 11. light shielding plate, 12. second filter, 13. electronic ocular, 14. area-array camera, 15. black anti-dazzling screen, 101. forward scattering light source, 102. absorption light source, 201. First aperture, and 202. second aperture.

DETAILED DESCRIPTION

The following clearly and completely describes the technical solutions in the embodiments of the present invention with reference to accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

The present invention is intended to provide a multi-mode imaging optical system, which can realize in-situ imaging of different modes for a to-be-tested sample, and features simple structure and low cost.

To make the above objects, features, and advantages of the present invention more obvious and easy to understand, the present invention will be further described in detail with reference to the accompanying drawings and the detailed description.

Figure 1:
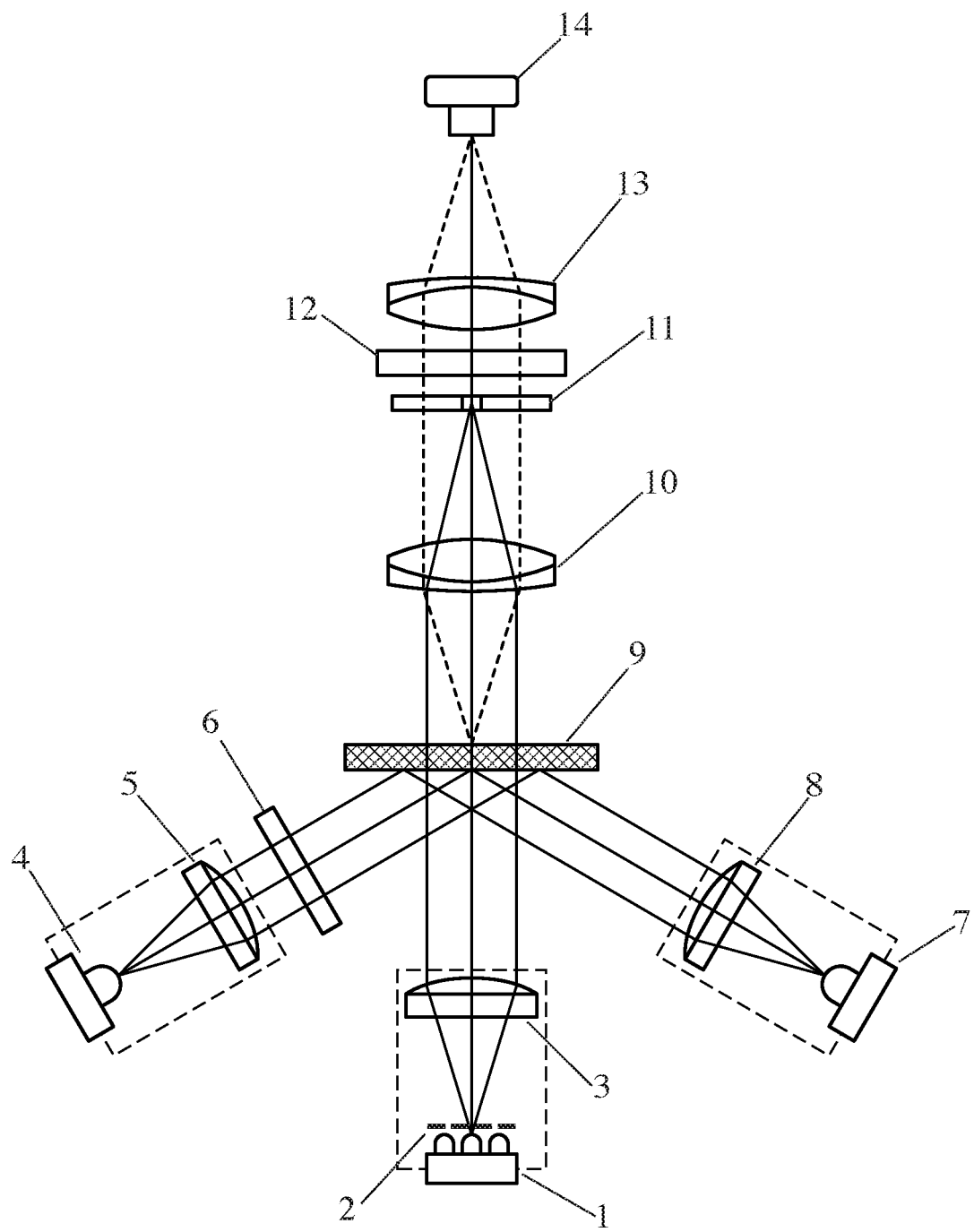
FIG. 1 is a schematic structural diagram of a multi-mode imaging optical system according to an embodiment of the present invention.

FIG. 1 is a schematic structural diagram of a multi-mode imaging optical system according to an embodiment of the present invention. As shown in FIG. 1, the multi-mode imaging optical system provided by the present invention includes a stage 9, an imaging unit, an absorption and forward scattering illumination unit, a side scattering illumination unit, and a fluorescent illumination unit.

The stage 9 is configured to hold a to-be-tested sample. The to-be-tested sample is generally a thin-layer liquid sample, such as a microparticle solution in a microfluidic chip or a liquid sample on a glass slide.

The imaging unit is configured to implement in-situ imaging of the to-be-tested sample. The imaging unit includes an objective lens 10, a light shielding plate 11, a second filter 12, an electronic ocular 13, and an area-array camera 14. The stage 9 and the light shielding plate 11 each are placed on a focal plane of the objective lens 10. The area-array camera 14 is configured to implement focus imaging of the to-be-tested sample.

Figure 4:
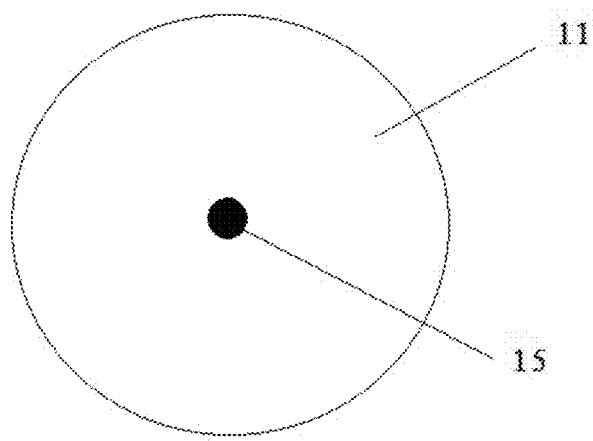
FIG. 4 is a schematic structural diagram of a light shielding plate according to an embodiment of the present invention.

As shown in FIG. 4, a black anti-dazzling screen 15 is provided on the light shielding plate 11 to block directly transmitted illumination light.

Further, the second filter 12 is a fluorescent filter.

The absorption and forward scattering illumination unit, the stage 9, and the imaging unit are arranged coaxially in turn. The absorption and forward scattering illumination unit is configured to irradiate the to-be-tested sample, and form absorption imaging or forward scattered light imaging in the imaging unit.

A first given angle is formed between the side scattering illumination unit and the stage 9. The side scattering illumination unit is configured to perform first oblique illumination on the to-be-tested sample, so that scattered light of microparticles in the to-be-tested sample forms side scattered light imaging in the imaging unit.

Specifically, the first given angle is 15-30 degrees, so that the first oblique illumination can be performed on the to-be-tested sample.

A second given angle is formed between the fluorescent illumination unit and the stage. The fluorescent illumination unit is configured to perform second oblique illumination on the to-be-tested sample, and excite the microparticles in the to-be-tested sample to emit fluorescence. The fluorescence forms fluorescence imaging in the imaging unit.

Specifically, the second given angle is 30-60 degrees, so that the second oblique illumination can be performed on the to-be-tested sample.

The absorption and forward scattering illumination unit in the multi-mode imaging optical system provided by the present invention includes an absorption and forward scattering collimation lens 3, an absorption and forward scattering light source 1, and a microplate 2.

The absorption and forward scattering collimation lens 3 is arranged coaxially with the stage 9, and configured to focus a beam.

A focal length of the absorption and forward scattering collimation lens 3 is greater than 15 mm, and preferably greater than 20 mm to obtain higher illumination uniformity.

The absorption and forward scattering light source 1 is located on a focal plane of the absorption and forward scattering collimation lens away from the stage 9, and configured to emit absorbed light or forward scattered light. The absorbed light or forward scattered light vertically irradiates the to-be-tested sample, and forms absorption imaging or forward scattered light imaging in the imaging unit.

Figure 2:
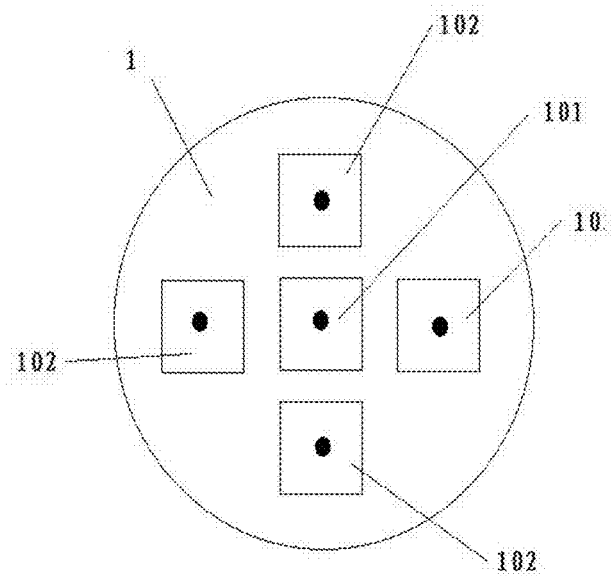
FIG. 2 is a schematic structural diagram of an absorption and forward scattering light source according to an embodiment of the present invention.

In addition, as shown in FIG. 2, the absorption and forward scattering light source 1 includes a forward scattering light source 101 and a plurality of absorption light sources 102, where a quantity of absorption light sources 102 is 4.

The forward scattering light source 101 is placed at a center position. The four absorption light sources 102 are symmetrically distributed around the forward scattering light source 101, 3 to 5 mm away from the center of the forward scattering light source 101.

Figure 3:
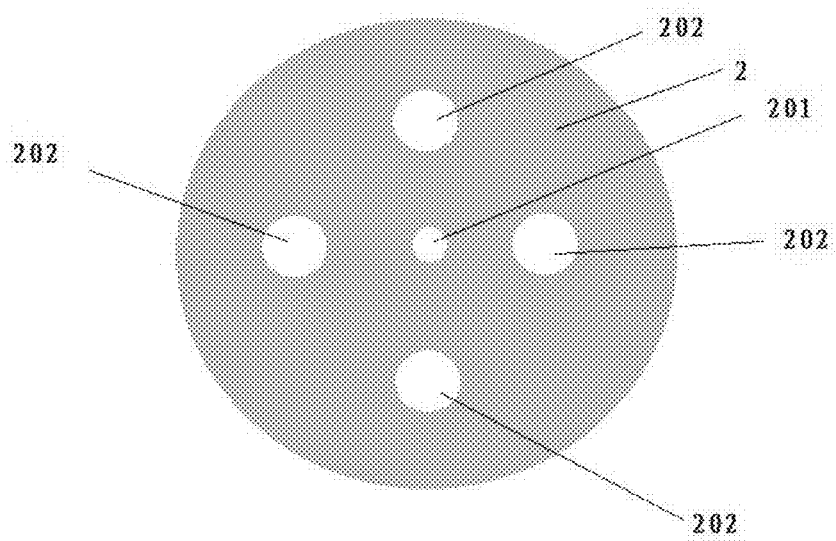
FIG. 3 is a schematic structural diagram of a microplate according to an embodiment of the present invention.

The microplate 2 is disposed corresponding to the absorption and forward scattering light source 1. An aperture is provided in the microplate 2 corresponding to the absorption and forward scattering light source 1, so that the absorbed light or forward scattered light can pass through the microplate 2. As shown in FIG. 3, the microplate 2 includes a first aperture 201 and a plurality of second apertures 202. The first aperture 201 corresponds to the forward scattering light source 101, and the second apertures 202 correspond to the absorption light sources 102.

A diameter of the first aperture 201 is less than 0.5 mm, and a diameter of the second aperture 202 is 1-2 mm. The black anti-dazzling screen 15 has a diameter slightly larger than that of the first aperture 201, but it cannot block light paths of the second apertures 202, further ensuring that the directly transmitted illumination light is completely blocked.

To prevent the light from the four second apertures 202 from being blocked by the black anti-dazzling screen 15, a distance between adjacent apertures is greater than or equal to 0.5 mm in this embodiment.

Specifically, when the plurality of absorption light sources 102 are turned on and other light sources are turned off, the absorbed light emitted by the absorption light sources 102 irradiates the to-be-tested sample. The microparticles in the to-be-tested sample can absorb some light, and the light transmitted through the to-be-tested sample enters the imaging system and forms an absorption image of the to-be-tested sample in the area-array camera 14.

When the forward scattering light source 101 is turned on and other light sources are turned off, the forward scattered light emitted by the forward scattering light source 101 irradiates the to-be-tested sample through the first aperture 201 and the absorption and forward scattering collimation lens 3, and the light directly transmitted through the to-be-tested sample converges at a back focus of the objective lens 10 and is completely blocked by the black anti-dazzling screen 15 on the light shielding plate 11. Therefore, the directly transmitted light cannot enter the area-array camera 14. The microparticles in the to-be-tested sample generate scattered light, which passes through the objective lens 10 and becomes approximately parallel beams. More than 90% of the scattered light can pass through the light shielding plate 11, is converged to the area-array camera 14 by the electronic ocular 13, and forms a forward scattered light image of the to-be-tested sample.

The side scattering illumination unit in the multi-mode imaging optical system provided by the present invention includes a side scattering light source 7 and a side scattering collimation lens 8. The side scattering light source 7 is located on a focal plane of the side scattering collimation lens 8 away from the stage 9, and is coaxially arranged with a center of the side scattering collimation lens 8.

The side scattering collimation lens 8 has a focal length of 15 to 30 mm, which can achieve illumination uniformity while maintaining a high light use efficiency.

Specifically, when the side scattering light source 7 is turned on and other light sources are turned off, the light emitted by the side scattering light source 7 irradiates the to-be-tested sample through the side scattering collimation lens 8, but the light directly transmitted through the to-be-tested sample cannot enter the imaging system through the objective lens 10. The microparticles in the to-be-tested sample generate scattered light, which passes through the objective lens 10 and becomes approximately parallel beams. More than 90% of the scattered light passes through the light shielding plate, is converged to the area-array camera 14 by the electronic ocular 13, and forms a side scattered light image of the to-be-tested sample.

The fluorescent illumination unit in the multi-mode imaging optical system provided by the present invention includes a fluorescent light source 4, a fluorescent collimation lens 5, and a first filter 6. The fluorescent light source 4 is placed on a focal plane of the fluorescent collimation lens 5 away from the stage 9, the first filter 6 is placed between the fluorescent collimation lens 5 and the stage 9, and the fluorescent light source 4, the fluorescent collimation lens 5, and the first filter 6 are coaxially arranged along their centers.

A transmission wavelength of the first filter 6 is consistent with a center wavelength of the fluorescent light source 4.

A transmission spectral range of the first filter 6 does not overlap with a transmission spectral range of the first filter 12, and transmittance of the transmitted light of the first filter 6 is less than 0.01%.

Specifically, when the fluorescent light source 4 is turned on and other light sources are turned off, the light emitted by the fluorescent light source 4 irradiates the to-be-tested sample through the fluorescent collimation lens 5 and the first filter 6. The microparticles in the to-be-tested sample generate fluorescence, which passes through the objective lens 10 and becomes approximately parallel beams. More than 90% of the fluorescence passes through the light shielding plate 11 and the second filter 12, is converged to the area-array camera 14 by the electronic ocular 13, and forms a forward fluorescence image of the to-be-tested sample. Although the scattered light emitted by the microparticles in the to-be-tested sample can pass through the light shielding plate 11, it cannot pass through the second filter 12. Therefore, the direct scattered light of the microparticles in the to-be-tested sample does not interfere with fluorescence imaging.

The multi-mode imaging optical system provided by the present invention realizes in-situ imaging of different modes for a sample by turning on different illumination units. Without mechanical switching of any components, the present invention can implement in-situ absorption imaging, forward scattered light imaging, side scattered light imaging, and fluorescence imaging for characteristic analysis and classification counting of microparticles in the sample. The present invention can be widely applied to scientific research, clinical examination, and industrial test.

In this paper, several examples are used for illustration of the principles and implementations of the present invention. The description of the foregoing embodiments is used to help illustrate the method of the present invention and the core principles thereof. In addition, those of ordinary skill in the art can make various modifications in terms of specific implementations and scope of application in accordance with the teachings of the present invention. In conclusion, the content of the specification shall not be construed as a limitation to the present invention.

What is claimed is:

1. A multi-mode imaging optical system comprising:
   a stage configured to hold a to-be-tested sample;
   an imaging unit configured to implement in-situ imaging of the to-be-tested sample, the imaging unit having an objective lens, a light shielding plate, a second filter, an electronic ocular, and an area-array camera, the stage and the light shielding plate each being placed on a focal plane of the objective lens, and the area-array camera is configured to implement focus imaging of the to-be-tested sample;
   an absorption and forward scattering illumination light source, disposed coaxially with the stage and the imaging unit in turn and configured to irradiate the to-be-tested sample, and form absorption imaging or forward scattered light imaging in the imaging unit;
   a side scattering illumination light source, forming a first given angle with the stage and configured to perform a first oblique illumination on the to-be-tested sample, so that scattered light of microparticles in the to-be-tested sample forms side scattered light imaging in the imaging unit; and
   a fluorescent illumination light source, forming a second given angle with the stage and configured to perform a second oblique illumination on the to-be-tested sample, and excite the microparticles in the to-be-tested sample to emit fluorescence, wherein the fluorescence forms fluorescence imaging in the imaging unit.

2. The multi-mode imaging optical system according to claim 1, wherein the absorption and forward scattering illumination light source comprises:
   an absorption and forward scattering collimation lens, coaxially arranged with the stage and configured to focus a beam;
   an absorption and forward scattering light source, located on a focal plane of the absorption and forward scattering collimation lens away from the stage, and configured to emit absorbed light or forward scattered light, wherein the absorbed light or forward scattered light vertically irradiates the to-be-tested sample, and forms absorption imaging or forward scattered light imaging in the imaging unit; and
   a microplate having an aperture and being disposed corresponding to the absorption and forward scattering light source so that the absorbed light or forward scattered light can pass through the microplate.

3. The multi-mode imaging optical system according to claim 2, wherein the absorption and forward scattering light source comprises:
   a forward scattering light source, configured to emit forward scattered light, wherein the forward scattered light irradiates the to-be-tested sample through the aperture opened in the microplate and the absorption and forward scattering collimation lens, so that scattered light of the microparticles in the to-be-tested sample forms forward scattered light imaging in the imaging unit; and
   a plurality of absorption light sources symmetrically distributed around the forward scattering light source and configured to emit absorbed light, wherein the absorbed light irradiates the to-be-tested sample through the aperture opened in the microplate and the absorption and forward scattering collimation lens, so that transmitted light of the to-be-tested sample forms absorption imaging in the imaging unit.

4. The multi-mode imaging optical system according to claim 3, wherein there are four absorption light sources.

5. The multi-mode imaging optical system according to claim 1, wherein the side scattering illumination light source comprises: a side scattering light source and a side scattering collimation lens, wherein the side scattering light source is located on a focal plane of the side scattering collimation lens away from the stage, and is arranged coaxially with a center of the side scattering collimation lens.

6. The multi-mode imaging optical system according to claim 1, wherein the fluorescent illumination light source comprises a fluorescent light source, a fluorescent collimation lens, and a first filter; the fluorescent light source is placed on a focal plane of the fluorescent collimation lens away from the stage; the first filter is placed between the fluorescent collimation lens and the stage; and the fluorescent light source, the fluorescent collimation lens, and the first filter are coaxially arranged along their centers.

7. The multi-mode imaging optical system according to claim 6, wherein a transmission wavelength of the first filter is consistent with a center wavelength of the fluorescent light source.

8. The multi-mode imaging optical system according to claim 1, further comprising a black anti-dazzling screen provided at a center of the light shielding plate to block directly transmitted illumination light.

9. The multi-mode imaging optical system according to claim 1, wherein the second filter is a fluorescent filter.

* * * * *